United States Patent
Iwama et al.

(10) Patent No.: US 12,455,411 B2
(45) Date of Patent: Oct. 28, 2025

(54) LIGHT SOURCE DEVICE AND PROJECTOR

(71) Applicant: SEIKO EPSON CORPORATION, Tokyo (JP)

(72) Inventors: Yuichiro Iwama, Azumino (JP); Norio Imaoka, Takamori-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/793,252

(22) Filed: Aug. 2, 2024

(65) Prior Publication Data

US 2025/0044501 A1 Feb. 6, 2025

(51) Int. Cl.
*F21V 8/00* (2006.01)
*G02B 21/16* (2006.01)

(52) U.S. Cl.
CPC ......... *G02B 6/0093* (2013.01); *G02B 6/0003* (2013.01); *G02B 6/0068* (2013.01); *G02B 6/0085* (2013.01); *G02B 21/16* (2013.01)

(58) Field of Classification Search
CPC .. G02B 6/0093; G02B 6/0003; G02B 6/0068; G02B 6/0085; G02B 21/16
See application file for complete search history.

(56) References Cited

U.S. PATENT DOCUMENTS

| | | | |
|---|---|---|---|
| 11,835,747 B2* | 12/2023 | Yu | G02B 6/0085 |
| 2013/0027635 A1* | 1/2013 | Urano | G02B 6/0065 |
| | | | 362/618 |
| 2013/0286294 A1* | 10/2013 | Hosoki | G02B 6/0091 |
| | | | 348/739 |
| 2014/0307464 A1* | 10/2014 | Horiuchi | G02B 6/0091 |
| | | | 362/602 |
| 2014/0347884 A1* | 11/2014 | Fujiuchi | G02B 6/0071 |
| | | | 362/217.05 |
| 2018/0284340 A1* | 10/2018 | Koizumi | G03B 21/16 |
| 2020/0026172 A1* | 1/2020 | Sakata | G02B 27/0994 |
| 2020/0033536 A1* | 1/2020 | Suzuki | G03B 21/208 |
| 2021/0254799 A1* | 8/2021 | Chang | F21V 9/30 |

FOREIGN PATENT DOCUMENTS

WO  WO 2020/254455 A  12/2020

* cited by examiner

*Primary Examiner* — Mary Ellen Bowman
(74) *Attorney, Agent, or Firm* — Dority & Manning, P.A.

(57) ABSTRACT

A light source device including: a support member includes a groove in which a light guide member is disposed, a light source substrate and the support member are in contact with each other with a convex portion, and the convex portion is disposed on at least one of an opposed surface opposed to a first surface of the light source substrate and the first surface of the light source substrate to separate a light emitting element from the support member and a light guide member.

6 Claims, 8 Drawing Sheets

LIGHT SOURCE DEVICE AND PROJECTOR

The present application is based on, and claims priority from JP Application Serial Number 2023-126579, filed Aug. 2, 2023, the disclosure of which is hereby incorporated by reference herein in its entirety.

BACKGROUND

1. Technical Field

The present disclosure relates to a light source device and a projector.

2. Related Art

As a light source device used in a projector, there has been proposed a light source device using fluorescence emitted from a phosphor when the phosphor is irradiated with excitation light emitted from a light emitting element.

WO 2020/254455 described below discloses a light source device including an excitation light source having a light emitting element and a support substrate, a phosphor rod which converts excitation light emitted from the light emitting element into fluorescence, and a support body for releasing heat generated by the phosphor rod. In this light source device, the phosphor rod is pressed by a contact member provided to a support substrate of the excitation light source to thereby be held in a groove of the support body.

WO 2020/254455 is an example of the related art.

However, in the light source device in WO 2020/254455, there is a possibility that warpage is caused in the support substrate due to the heat of the light emitting element in the excitation light source. For example, when the warpage toward the phosphor rod occurs in the support substrate, the contact member presses the phosphor rod too strongly, and thus, there is a possibility of breakage, or a possibility that it becomes unachievable to obtain the desired optical characteristics.

In addition, when the contact member is not provided, there is a possibility that the distance between the phosphor rod and the light emitting element varies due to the warpage of the support substrate to make it unachievable to obtain the desired optical characteristics, and when the distance between the phosphor rod and the light emitting element is too short, there is a possibility that the phosphor rod and the light emitting element make contact with each other to cause the breakage, or to make it unachievable to obtain the desired optical characteristics.

The description is hereinabove presented citing the light source device involving wavelength conversion as an example, but even in the light source device which does not involve the wavelength conversion, it is desired to provide a light source device which obtains the desired optical characteristics, and is excellent in reliability.

SUMMARY

In view of the problem described above, a light source device according to an aspect of the present disclosure includes: a light source unit including a light source substrate including a first surface and a second surface opposite to the first surface, and a light emitting element disposed on the first surface of the light source substrate; a light guide member configured to guide light emitted from the light emitting element of the light source unit; a support member configured to support the light guide member in a groove; a fixation part provided to an outer peripheral edge portion of the light source substrate and configured to fix the light source unit and the support member to each other so that the light emitting element disposed on the first surface of the light source substrate and the light guide member are opposed to each other; and a convex portion located at an inner peripheral side of the light source substrate with respect to the fixation part, wherein the support member includes the groove in which the light guide member is disposed, the light source substrate and the support member are in contact with each other with the convex portion, and the convex portion is disposed on at least one of an opposed surface opposed to the first surface of the light source substrate and the first surface of the light source substrate to separate the light emitting element from the support member and the light guide member.

A projector according to an aspect of the present disclosure includes: the light source device according to the aspect of the present disclosure; a light modulation device configured to modulate light emitted from the light source device in accordance with image information; and a projection optical device configured to project the light modulated by the light modulation device.

DESCRIPTION OF EMBODIMENTS

An embodiment of the present disclosure will hereinafter be described.

A projector according to the present embodiment is an example of a projector using liquid crystal panels as light modulation devices.

In the following drawings, elements are drawn at different dimensional scales in some cases in order to make the elements eye-friendly.

Figure 1:
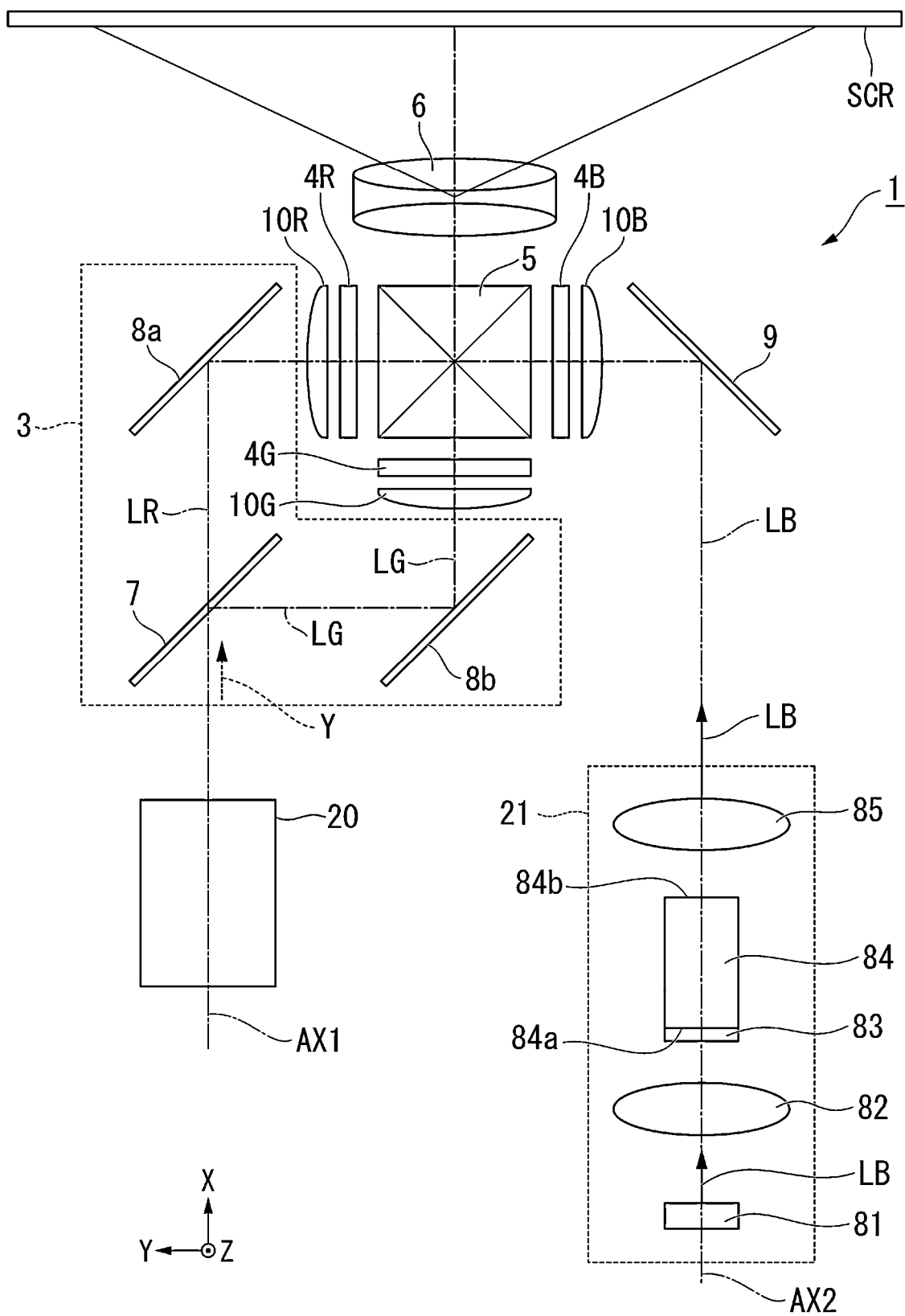
FIG. 1 is a diagram showing a schematic configuration of a projector according to an embodiment.

FIG. 1 is a diagram showing a schematic configuration of a projector 1 according to the present embodiment.

The projector 1 according to the present embodiment is a projection-type image display apparatus that displays a color image on a screen SCR, which is a projection target surface, as shown in FIG. 1. The projector 1 includes three light modulation devices corresponding to respective colored light, namely red light LR, green light LG, and blue light LB.

The projector 1 includes a first illumination device 20, a second illumination device 21, a color separation optical system 3, a light modulation device 4R, a light modulation device 4G, a light modulation device 4B, a light combining element 5, and a projection optical device 6.

The first illumination device 20 emits yellow fluorescence Y toward the color separation optical system 3. The second illumination device 21 emits the blue light LB toward the light modulation device 4B. Detailed configurations of the first illumination device 20 and the second illumination device 21 will be described later.

The description with reference to the drawings will hereinafter be made using an X-Y-Z orthogonal coordinate systemin as needed. The Z axis is an axis extending along a vertical direction of the projector 1. The X axis is an axis parallel to an optical axis AX1 of the first illumination device 20 and an optical axis AX2 of the second illumination device 21. The Y axis is an axis perpendicular to the X axis and the Z axis. The optical axis AX1 of the first illumination device 20 is a central axis of the fluorescence Y emitted from the first illumination device 20. The optical axis AX2 of the second illumination device 21 is a central axis of the blue light LB emitted from the second illumination device 21. One of the two directions along the X axis is referred to as a +X direction, the opposite direction to the +X direction is referred to as a −X direction, one of the two directions along the Y axis is referred to as a +Y direction, the opposite direction to the +Y direction is referred to as a −Y direction, one of the two directions along the Z axis is referred to as a +Z direction, and the opposite direction to the +Z direction is referred to as a −Z direction. The two directions along the X axis are referred to as an X-axis direction when not distinguished from each other, the two directions along the Y axis are referred to as a Y-axis direction when not distinguished from each other, and the two directions along the Z axis are referred to as a Z-axis direction when not distinguished from each other.

The color separation optical system 3 separates the yellow fluorescence Y emitted from the first illumination device 20 into the red light LR and the green light LG. The color separation optical system 3 includes a dichroic mirror 7, a first reflecting mirror 8a, and a second reflecting mirror 8b.

The dichroic mirror 7 separates the fluorescence Y into the red light LR and the green light LG. The dichroic mirror 7 transmits the red light LR and reflects the green light LG. The second reflecting mirror 8b is disposed in a light path of the green light LG. The second reflecting mirror 8b reflects the green light LG, which has been reflected by the dichroic mirror 7, toward the light modulation device 4G. The first reflecting mirror 8a is disposed in the light path of the red light LR. The first reflecting mirror 8a reflects the red light LR, which has been transmitted through the dichroic mirror 7, toward the light modulation device 4R.

Meanwhile, the blue light LB emitted from the second illumination device 21 is reflected by a reflecting mirror 9 toward the light modulation device 4B.

The configuration of the second illumination device 21 will hereinafter be described.

The second illumination device 21 includes a light source unit 81, a condenser lens 82, a diffuser plate 83, a rod lens 84, and a relay lens 85. The light source unit 81 is formed of at least one semiconductor laser. The light source unit 81 emits the blue light LB formed of a laser beam. The light source unit 81 is not necessarily formed of a semiconductor laser, and may be formed of an LED that emits blue light.

The condenser lens 82 is formed of a convex lens. The condenser lens 82 causes the blue light LB emitted from the light source unit 81 to enter the diffuser plate 83 in a state of being substantially converged thereon. The diffuser plate 83 diffuses the blue light LB emitted from the condenser lens 82 at a predetermined degree of diffusion to generate the blue light LB having a substantially uniform light distribution similar to that of the fluorescence Y emitted from the first illumination device 20. As the diffuser plate 83, there is used, for example, a ground glass plate made of optical glass.

The blue light LB diffused by the diffuser plate 83 enters the rod lens 84. The rod lens 84 has a prismatic shape extending along the direction of the optical axis AX2 of the second illumination device 21. The rod lens 84 has a light incident end surface 84a disposed at one end and a light exit end surface 84b disposed at the other end. The diffuser plate 83 is fixed to the light incident end surface 84a of the rod lens 84 via an optical adhesive (not shown). It is desirable that the refractive index of the diffuser plate 83 matches as much as possible with the refractive index of the rod lens 84.

The blue light LB propagates through the interior of the rod lens 84 while being totally reflected therein to thereby be emitted from the light exit end surface 84b in a state in which uniformity of the illuminance distribution is enhanced. The blue light LB emitted from the rod lens 84 enters the relay lens 85. The relay lens 85 causes the blue light LB, the illuminance distribution of which is enhanced in uniformity by the rod lens 84, to enter the reflecting mirror 9.

The light exit end surface 84b of the rod lens 84 has a rectangular shape substantially similar to the shape of an image formation region of the light modulation device 4B. The blue light LB emitted from the rod lens 84 is thus efficiently incident on the image formation region of the light modulation device 4B.

The light modulation device 4R modulates the red light LR in accordance with image information to form image light corresponding to the red light LR. The light modulation device 4G modulates the green light LG in accordance with image information to form image light corresponding to the green light LG. The light modulation device 4B modulates the blue light LB in accordance with image information to form image light corresponding to the blue light LB.

As each of the light modulation devices 4R, 4G, and 4B, there is used, for example, a transmissive liquid crystal panel. Further, polarization plates (not shown) are respectively disposed at an incident side and an exit side of the liquid crystal panel. The polarization plate only transmits linearly polarized light polarized in a specific direction.

A field lens 10R is disposed at the incident side of the light modulation device 4R. A field lens 10G is disposed at the incident side of the light modulation device 4G. A field lens 10B is disposed at the incident side of the light modulation device 4B. The field lens 10R collimates the chief ray of the red light LR to be incident on the light modulation device 4R. The field lens 10G collimates the chief ray of the green light LG to be incident on the light modulation device 4G. The field lens 10B collimates the chief ray of the blue light LB to be incident on the light modulation device 4B.

In response to the image light emitted from the light modulation device 4R, the image light emitted from the light modulation device 4G, and the image light emitted from the light modulation device 4B entering the light combining element 5, the light combining element 5 combines the image light corresponding to the red light LR, the image light corresponding to the green light LG, and the image light corresponding to the blue light LB with one another to emit the image light thus combined toward the projection optical device 6. As the light combining element 5, there is used, for example, a cross dichroic prism.

The projection optical device 6 is formed of a plurality of projection lenses. The projection optical device 6 projects the image light combined by the light combining element 5 toward the screen SCR in an enlarged manner. Thus, a color image is displayed on the screen SCR.

A configuration of the first illumination device 20 will subsequently be described.

Figure 2:
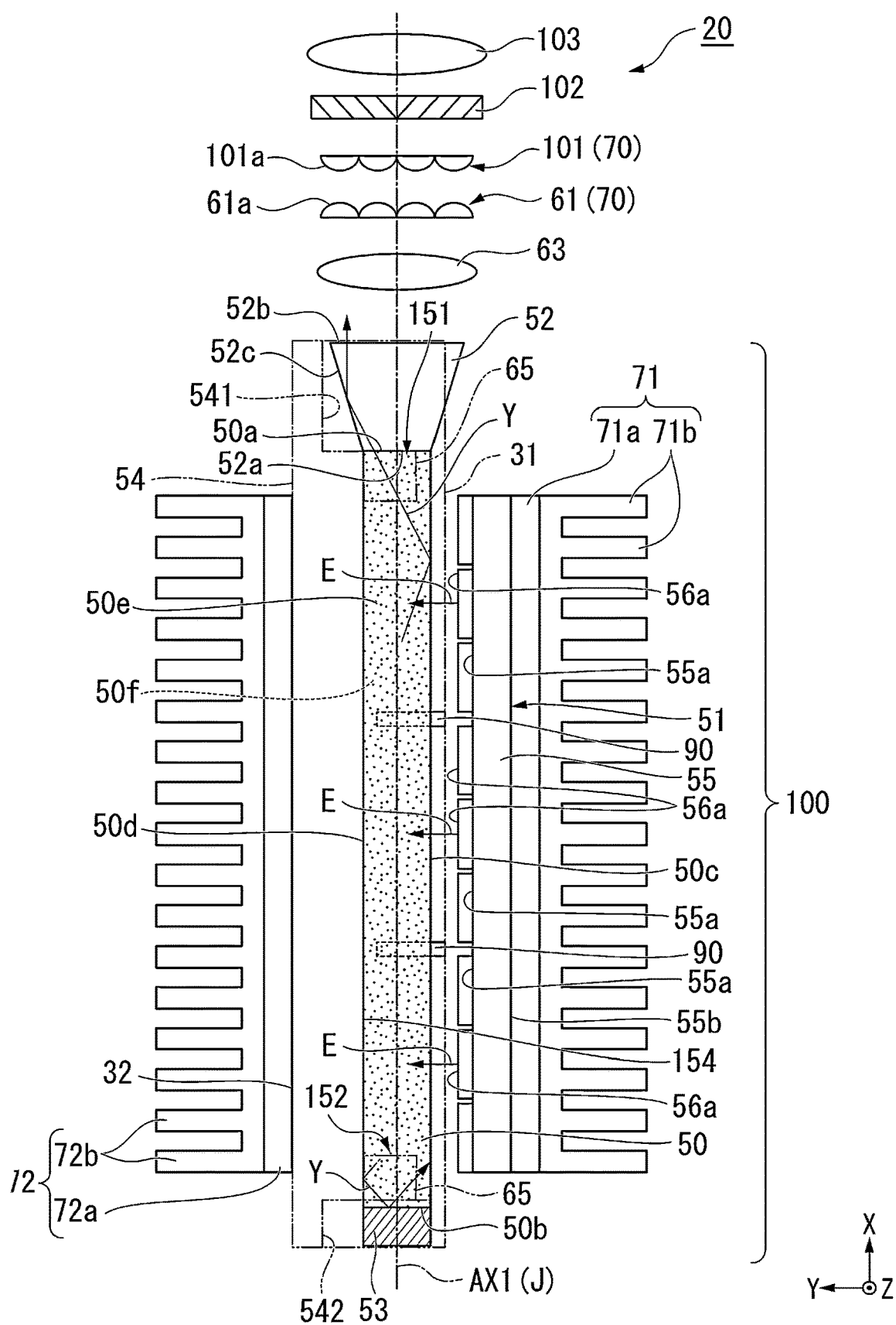
FIG. 2 is a schematic configuration diagram of a first illumination device.

FIG. 2 is a schematic configuration diagram of the first illumination device 20.

The first illumination device 20 includes a light source device 100, a collimating optical system 63, an integrator optical system 70, a polarization conversion element 102, and a superimposing optical system 103, as shown in FIG. 2.

The light source device 100 includes a wavelength conversion member 50, a light source unit 51, an angle conversion member 52, a mirror 53, a support member 54, a first heat dissipation member 71, a second heat dissipation member 72, a holding member 65, and a pair of pressing members 90. The wavelength conversion member 50 in the present embodiment corresponds to a "light guide member" in the appended claims.

The wavelength conversion member 50 has a quadrangular columnar shape extending along the X axis and has six surfaces. In the wavelength conversion member 50, the sides extending along the X axis are longer than the sides extending along the Y axis and the sides extending along the Z axis. Therefore, the X axis corresponds to a longitudinal direction of the wavelength conversion member 50. The length of the sides extending along the Y axis is equal to the length of the sides extending along the Z axis. That is, the cross-sectional shape of the wavelength conversion member 50 cut by a plane along the Y-Z plane perpendicular to the X axis is a square. The cross-sectional shape of the wavelength conversion member 50 cut by the plane along the Y-Z plane may be a rectangular shape.

The wavelength conversion member 50 has a first surface 50a and a second surface 50b, a third surface 50c and a fourth surface 50d, and a fifth surface 50e and a sixth surface 50f. The first surface 50a and the second surface 50b cross the X axis extending along the longitudinal direction of the wavelength conversion member 50 and are located at respective sides opposite to each other in the X axis. In the present embodiment, the first surface 50a is located at the +X side which is one of the X-axis directions along the X axis, and the second surface 50b is located at the −X side which is the opposite direction of the X-axis directions.

The third surface 50c and the fourth surface 50d cross the first surface 50a and the second surface 50b, and are located at respective sides opposite to each other in the Y axis which crosses, is perpendicular to in the case of the present embodiment, the X axis along the longitudinal direction of the wavelength conversion member 50. In the present embodiment, the third surface 50c is located at the −Y side which is one of the Y-axis directions along the Y axis, and the fourth surface 50d is located at the +Y side which is the other of the Y-axis directions.

The fifth surface 50e and the sixth surface 50f cross the third surface 50c and the fourth surface 50d, and are located at respective sides opposite to each other in the Z axis which crosses, is perpendicular to in the present embodiment, the X axis and the Y axis. In the present embodiment, the fifth surface 50e is located at the +Z direction side which is a side in one of the Z-axis directions, and the sixth surface 50f is located at the −Z direction side which is a side in the other of the Z-axis directions.

In the following description, the third surface 50c, the fourth surface 50d, the fifth surface 50e, and the sixth surface 50f may be simply referred to as side surfaces 50c, 50d, 50e, and 50f in some cases when they are not distinguished from each other.

The wavelength conversion member 50 at least includes a phosphor, and converts excitation light E which is emitted from light emitting elements 56 of the light source unit 51 and has a first wavelength band into the fluorescence Y which has a second wavelength band different from the first wavelength band. The excitation light E enters the wavelength conversion member 50 via the third surface 50c. The fluorescence Y is guided through the interior of the wavelength conversion member 50 and is then emitted from the first surface 50a. The excitation light E in the present embodiment corresponds to "first light" in the appended claims. The fluorescence Y in the present embodiment corresponds to "second light" in the appended claims.

The wavelength conversion member 50 contains a ceramic phosphor formed of a polycrystalline phosphor that performs the wavelength conversion on the excitation light E into the fluorescence Y. The second wavelength band that the fluorescence Y has is a yellow wavelength band in a range of, for example, 490 through 750 nm. That is, the fluorescence Y is yellow fluorescence containing a red light component and a green light component.

The wavelength conversion member 50 may include a single crystal phosphor instead of a polycrystalline phosphor. Alternatively, the wavelength conversion member 50 may be made of fluorescent glass. Alternatively, the wavelength conversion member 50 may be formed of a material obtained by dispersing a large number of phosphor particles in a binder made of glass or resin. The wavelength conversion member 50 made of such a material converts the excitation light E into the fluorescence Y.

Specifically, the material of the wavelength conversion member 50 includes, for example, an yttrium-aluminum-garnet-based (YAG-based) phosphor. Citing YAG: Ce including cerium (Ce) as an activator as an example, as the material of the wavelength conversion member 50, there is used a material obtained by mixing raw powder materials including elements such as $Y_2O_3$, $Al_2O_3$, or $CeO_3$ to cause a solid-phase reaction, Y—Al—O amorphous particles obtained by a wet method such as a coprecipitation method or a sol-gel method, YAG particles obtained by a gas-phase method such as a spray-drying method, a flame-based thermal decomposition method, or a thermal plasma method, or the like.

The light source unit 51 includes a light source substrate 55 and the plurality of light emitting elements 56. The light source substrate 55 includes a first surface 55a and a second surface 55b opposite to the first surface 55a. The light source substrate 55 has a structure in which a plurality of layers is stacked as described later.

The plurality of light emitting elements 56 is disposed on the first surface 55a of the light source substrate 55. The light source unit 51 in the present embodiment has the plurality of light emitting elements 56, but the number of the light emitting elements 56 is not particularly limited.

The light emitting elements 56 each have a light emitting surface 56a, from which the excitation light E having the first wavelength band is emitted. The light emitting elements 56 are each formed of, for example, a light emitting diode (LED). The light emitting surface 56a of each of the light emitting elements 56 is opposed to the third surface 50c of the wavelength conversion member 50, and emits the excitation light E toward the third surface 50c. The first wavelength band is, for example, a blue-violet wavelength band in a range of 400 nm through 480 nm, and a peak wavelength is, for example, 445 nm. As described above, the light source unit 51 is disposed to be opposed to the third surface 50c, which is one of the four side surfaces 50c, 50d, 50e, and 50f extending along the longitudinal direction of the wavelength conversion member 50.

Figure 3:
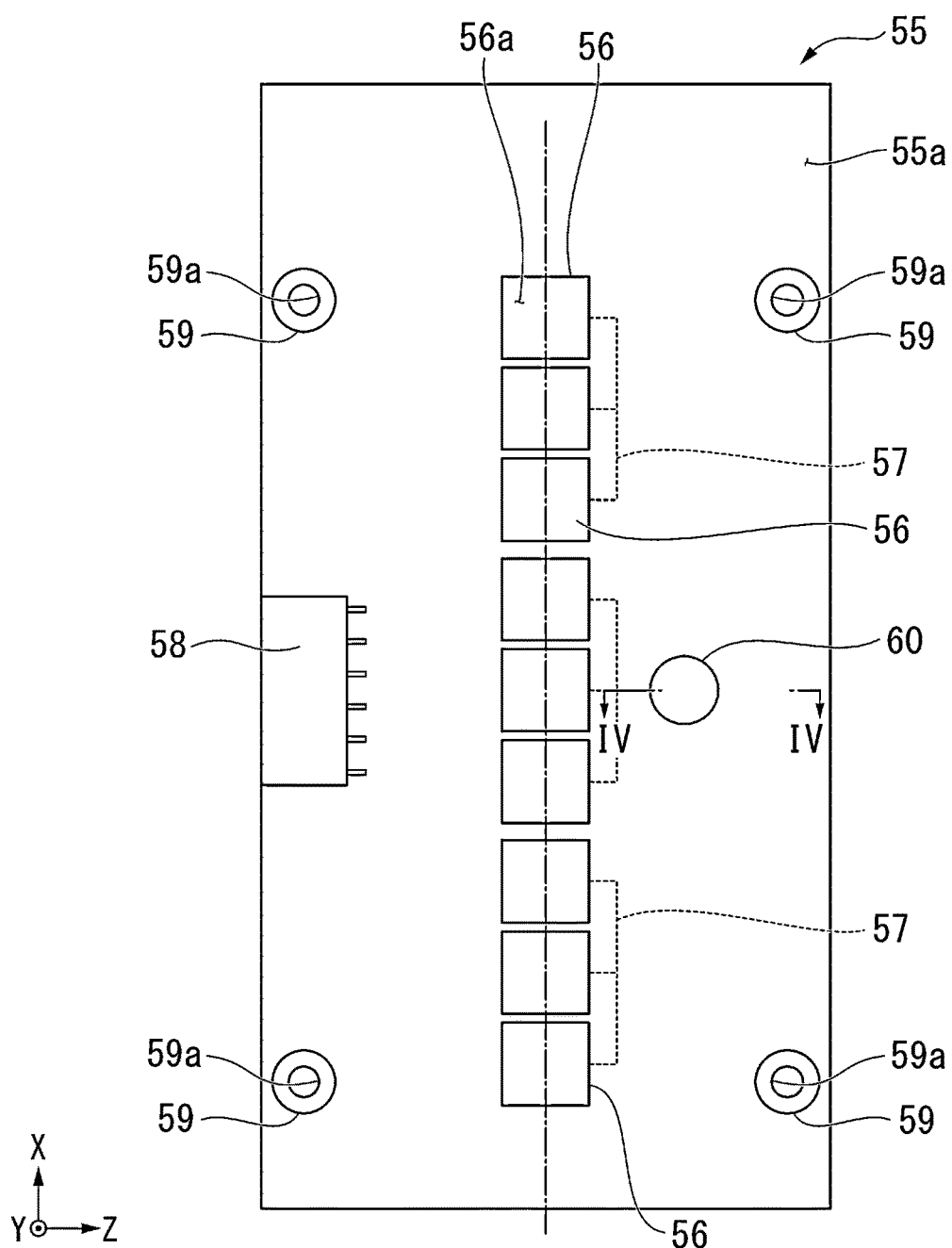
FIG. 3 is a plan view showing a configuration of a main part of a light source unit.

FIG. 3 is a plan view showing a configuration of a main part of the light source unit 51. FIG. 3 is a plan view of the first surface 55a of the light source substrate 55 of the light source unit 51.

As shown in FIG. 3, the light source substrate 55 has a substantially rectangular shape. The plurality of light emitting elements 56 are linearly arranged on the first surface 55a of the light source substrate 55. The light source substrate 55 further includes interconnections 57 electrically coupled to the plurality of light emitting elements 56, a connector unit 58 electrically coupled to the interconnections 57, a fixation part 59, and a concave portion 60.

The connector unit 58 electrically couples an external device and the light source unit 51 to each other. The connector unit 58 supplies the power supplied from the external device to the light emitting elements 56 via the interconnections 57. The fixation part 59 is a region for fixing the light source unit 51 to the support member 54 described later. The fixation part 59 of the light source substrate 55 is fixed to the support member 54 via screw members. The fixation part 59 includes a plurality of through holes, four through holes 59a in the case of the present embodiment, for inserting the screw members.

When the light source substrate 55 is fixed to the support member 54, a convex portion provided to the support member 54 is inserted into the concave portion 60.

The fixation part 59 is disposed in an outer circumferential edge portion of the light source substrate 55. Specifically, the four through holes 59a are respectively arranged at corner portions of the light source substrate 55 having a rectangular shape. The fixation part 59 fixes the light source unit 51 and the support member 54 to each other so that the light emitting elements 56 disposed on the first surface 55a of the light source substrate 55 are opposed to the wavelength conversion member 50.

In the case of the present embodiment, the fixation part 59 is also used to fix the first heat dissipation member 71 to the second surface 55b of the light source substrate 55. That is, the first heat dissipation member 71 is fixed to the support member 54 together with the light source substrate 55 via the same screw members. According to this configuration, by using the fixation part 59 for fixing the light source substrate 55 to the support member 54 also as threaded holes for fixing the first heat dissipation member 71, it is possible to decrease the number of the holes to be provided to the light source substrate 55. Accordingly, it is possible to improve the rigidity of the light source substrate 55.

Figure 4:
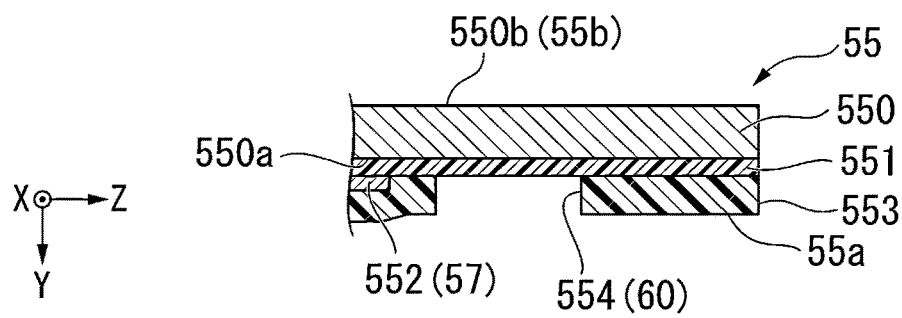
FIG. 4 is a cross-sectional view taken along the arrow line IV-IV in FIG. 3.

FIG. 4 is a cross-sectional view taken along the arrow line IV-IV in FIG. 3.

As shown in FIG. 4, the light source substrate 55 of the light source unit 51 includes a base 550 having an obverse surface 550a and a reverse surface 550b, a first insulating layer 551 provided to the obverse surface 550a which is one surface of the base 550, an interconnection layer 552 stacked at an opposite side of the first insulating layer 551 to the base 550 to form the interconnections 57, a second insulating layer 553 stacked on an opposite side of the first insulating layer 551 to the base 550 so as to cover the interconnection layer 552, and a concave portion 554 provided to the second insulating layer 553.

As the material of the base 550, there is used, for example, aluminum excellent in heat dissipation. The first insulating layer 551 and the second insulating layer 553 are formed of a resist film. The interconnection layer 552 is formed of an interconnection pattern made of copper foil. The concave portion 554 is an opening that exposes a part of the first insulating layer 551, and forms the concave portion 60.

In the present embodiment, the second surface 55b of the light source substrate 55 means the reverse surface 550b of the base 550, and the first surface 55a of the light source substrate 55 means a surface of a layer located at an outermost position out of the insulating layers and the interconnection layers stacked at the obverse surface 550a side of the base 550. Therefore, the first surface 55a of the light source substrate 55 does not mean a flat surface but means a surface including unevenness corresponding to the stacked structure of the insulating layers and the interconnection layers.

The light emitting element 56 is provided on the second insulating layer 553 in a region not shown, and is electrically coupled to the interconnection layer 552 via, for example, wire bonding. That is, the light emitting element 56 is disposed on the surface of the second insulating layer 553 forming the first surface 55a of the light source substrate 55.

Referring back to FIG. 2, the support member 54 has a groove 154 that extends in the X-axis direction along the longitudinal direction of the wavelength conversion member 50 and houses a part of the wavelength conversion member 50, the wavelength conversion member 50 is disposed inside the groove 154, and the heat generated by the wavelength conversion member 50 is diffused to be released to the outside. It is therefore desirable for the support member 54 to be formed of a material that has predetermined strength and is high in thermal conductivity. It is desirable to use metal such as aluminum or stainless steel, in particular, an aluminum alloy such as a 6061 aluminum alloy as the material of the support member 54. A specific configuration of the support member 54 will be described later.

The first heat dissipation member 71 is fixed to the second surface 55b of the light source substrate 55 to emit heat of the light source substrate 55. The first heat dissipation member 71 in the present embodiment corresponds to a "heat dissipation member" in the appended claims.

The first heat dissipation member 71 includes a flat plate part 71a and a plurality of fins 71b. The flat plate part 71a has contact with the second surface 55b of the light source substrate 55 over substantially the entire surface. The plurality of fins 71b is provided on the flat plate part 71a at intervals in a major-axis direction (X-axis direction) of the wavelength conversion member 50. The number of the fins 71b is not particularly limited. The first heat dissipation member 71 is made of metal excellent in heat dissipation such as stainless steel or aluminum.

The second heat dissipation member 72 is fixed to a back surface 32 of the support member 54 to release heat of the support member 54. The second heat dissipation member 72 includes a flat plate part 72a and a plurality of fins 72b. The flat plate part 72a is in contact with the back surface 32 of the support member 54 over substantially the entire surface. The plurality of fins 72b is provided on the flat plate part 72a at intervals in the major-axis direction (X-axis direction) of the wavelength conversion member 50. The number of the fins 72b is not particularly limited. The second heat dissipation member 72 is made of metal excellent in heat dissipation such as stainless steel or aluminum.

The wavelength conversion member 50 in the present embodiment includes a first protruding portion 151 which protrudes in the +X direction from the groove 154, and a second protruding portion 152 which protrudes in the −X direction from the groove 154.

The holding member 65 holds the first protruding portion 151 or the second protruding portion 152 protruding from the groove 154 of the support member 54. Therefore, the wavelength conversion member 50 is set in a state in which the wavelength conversion member 50 partially protrudes to the outside of the groove 154 of the support member 54 without having contact with a wall surface of the groove 154. The holding member 65 holds a portion of the wavelength conversion member 50 protruding to the outside of the groove 154. The holding member 65 regulates the position of the wavelength conversion member 50 with respect to the support member 54 in cooperation with the pair of pressing members 90.

The pair of pressing members 90 regulate a position in the Y-axis direction of the wavelength conversion member 50 with respect to the support member 54 inside the groove 154. The pair of pressing members 90 are disposed to be opposed to a support surface 54s of the groove 154. Thus, the pressing members 90 restrict the movement of the wavelength conversion member 50 in the Y-axis direction in the groove 154. The pressing members 90 are made of an elastically deformable material. As an example, the pressing members 90 are each formed of a leaf spring made of a metal material, and are formed of stainless steel such as SUS 304.

The pair of pressing members 90 are disposed at positions where the pressing members 90 do not overlap the light emitting elements 56 of the light source unit 51, and press the wavelength conversion member 50 against the support surface 54s of the groove 154 of the support member 54. The pair of pressing members 90 are fixed to the support member 54.

The mirror 53 is disposed on the second surface 50b of the wavelength conversion member 50. The mirror 53 reflects the fluorescence Y that has been guided through the interior of the wavelength conversion member 50 and has reached the second surface 50b. The mirror 53 is formed of a metal film or a dielectric multilayer film formed at the second surface 50b of the wavelength conversion member 50.

In the first illumination device 20, when the excitation light E emitted from the light source unit 51 enters the wavelength conversion member 50, the phosphor contained in the wavelength conversion member 50 is excited, and the fluorescence Y is emitted from random light emission points. The fluorescence Y travels omnidirectionally from the random light emission points, and the fluorescence Y traveling toward the four side surfaces 50c, 50d, 50e, and 50f travels toward the first surface 50a or the second surface 50b while repeating the total reflection at a plurality of places on the side surfaces 50c, 50d, 50e, and 50f. The fluorescence Y is guided and propagates through the interior of the wavelength conversion member 50 while being totally reflected, and exits via the first surface 50a. In the present embodiment, the fluorescence Y traveling toward the first surface 50a enters the angle conversion member 52 provided at the first surface 50a. The fluorescence Y traveling toward the second surface 50b is reflected by the mirror 53 and then travels toward the first surface 50a.

Out of the excitation light E having entered the wavelength conversion member 50, a part of the excitation light E that has not been used to excite the phosphor is reflected by members that are located around the wavelength conversion member 50, and include the light emitting elements 56 of the light source unit 51, or the mirror 53 disposed on the second surface 50b. The part of the excitation light E is therefore confined in the wavelength conversion member 50 and reused.

The angle conversion member 52 is disposed on the first surface 50a of the wavelength conversion member 50. The angle conversion member 52 is formed of, for example, a tapered rod. The angle conversion member 52 has a plane of incidence of light 52a, on which the fluorescence Y emitted from the wavelength conversion member 50 is incident, a light exit surface 52b, through which the fluorescence Y is emitted, and a side surface 52c which reflects the fluorescence Y incident thereon toward the light exit surface 52b.

The angle conversion member 52 has a truncated quadrangular pyramidal shape, and the cross-sectional area perpendicular to an optical axis J of the angle conversion member 52 increases along the traveling direction of the light. Therefore, the area of the light exit surface 52b is greater than the area of the plane of incidence of light 52a. An axis that passes through the centers of the light exit surface 52b and the plane of incidence of light 52a, and is parallel to the X axis is defined as the optical axis J of the angle conversion member 52. The optical axis J of the angle conversion member 52 coincides with the optical axis AX1 of the first illumination device 20.

The fluorescence Y having entered the angle conversion member 52 changes its orientation while traveling through the interior of the angle conversion member 52 so as to approximate to the direction parallel to the optical axis J every time the fluorescence Y is totally reflected by the side surface 52c. In such a manner, the angle conversion member 52 converts the exit angle distribution of the fluorescence Y emitted from the first surface 50a of the wavelength conversion member 50. Specifically, the angle conversion member 52 makes the maximum exit angle of the fluorescence Y at the light exit surface 52b smaller than the maximum incident angle of the fluorescence Y at the plane of incidence of light 52a.

In general, since the etendue of light specified by the product of the area of a light exit region and the maximum exit angle, which is the solid angle of the light, is preserved, the etendue of the fluorescence Y is preserved around the transmission of the fluorescence Y through the angle conversion member 52. The angle conversion member 52 has the configuration in which the area of the light exit surface 52b is greater than the area of the plane of incidence of light 52a as described above. Therefore, from the viewpoint of the etendue preservation, the angle conversion member 52 can therefore make the maximum exit angle of the fluorescence Y at the light exit surface 52b smaller than the maximum incident angle of the fluorescence Y at the plane of incidence of light 52a.

The angle conversion member 52 is fixed to the wavelength conversion member 50 via an optical adhesive not shown so that the plane of incidence of light 52a is opposed to the first surface 50a of the wavelength conversion member 50. That is, the angle conversion member 52 and the wavelength conversion member 50 are in contact with each other via the optical adhesive, and an air gap such as an air layer is not disposed between the angle conversion member 52 and the wavelength conversion member 50. When an air gap is disposed between the angle conversion member 52 and the wavelength conversion member 50, the fluorescence Y incident on the plane of incidence of light 52a at an angle greater than the critical angle out of the fluorescence Y having reached the plane of incidence of light 52a of the angle conversion member 52 is totally reflected by the plane of incidence of light 52a and cannot enter the angle conversion member 52. In contrast, when there is no air gap between the angle conversion member 52 and the wavelength conversion member 50 as in the present embodiment, the amount of lost component of the fluorescence Y that cannot enter the angle conversion member 52 due to the total reflection can be reduced. From the viewpoint described above, it is desirable that the refractive index of the angle conversion member 52 and the refractive index of the wavelength conversion member 50 are made coincide with each other as precise as possible.

As the angle conversion member 52, a compound parabolic concentrator (CPC) may be used instead of the tapered rod. Substantially the same advantages as those when using the tapered rod can be obtained when using the CPC as the angle conversion member 52. It should be noted that the light source device 100 may not necessarily include the angle conversion member 52.

The collimating optical system 63 is formed of a collimator lens and so on, and is disposed between the light source device 100 and the integrator optical system 70. The collimating optical system 63 further narrows the angular distribution of the fluorescence Y emitted from the light source device 100 to make the fluorescence Y high in degree of parallelism enter the integrator optical system 70. It should be noted that the collimating optical system 63 may not be provided when the fluorescence Y emitted from the angle conversion member 52 is sufficiently high in degree of parallelism.

The integrator optical system 70 includes a first lens array 61 and a second lens array 101. The integrator optical system 70 functions as a homogenous illumination optical system that homogenizes the intensity distribution of the fluorescence Y emitted from the light source device 100 in each of the light modulation devices 4R, 4G, which are illumination target regions in cooperation with the superimposing optical system 103. The fluorescence Y emitted from the collimating optical system 63 enters the first lens array 61. Along with the second lens array 101 disposed in a posterior stage of the light source device 100, the first lens array 61 forms the integrator optical system 70.

The first lens array 61 includes a plurality of first small lenses 61a. The plurality of first small lenses 61a is arranged in a matrix in a plane parallel to the Y-Z plane perpendicular to the optical axis AX1 of the first illumination device 20. The plurality of first small lenses 61a divides the fluorescence Y emitted from the angle conversion member 52 into a plurality of partial fluxes. The first small lenses 61a each have a rectangular shape substantially similar to the shape of the image formation region of each of the light modulation devices 4R, 4G. Thus, the partial fluxes emitted from the first lens array 61 are each efficiently incident on the image formation region of each of the light modulation devices 4R, 4G.

The fluorescence Y emitted from the first lens array 61 travels toward the second lens array 101. The second lens array 101 is disposed to be opposed to the first lens array 61. The second lens array 101 includes a plurality of second small lenses 101a corresponding to the plurality of first small lenses 61a of the first lens array 61. The second lens array 101 forms images of the plurality of first small lenses 61a of the first lens array 61 in the vicinity of the image formation region of each of the light modulation devices 4R, 4G in cooperation with the superimposing optical system 103. The plurality of second small lenses 101a is arranged in a matrix in a plane parallel to the Y-Z plane perpendicular to the optical axis AX1 of the first illumination device 20.

The first small lenses 61a of the first lens array 61 and the second small lenses 101a of the second lens array 101 are the same in size as each other in the present embodiment, but may be different in size from each other. Further, the first small lenses 61a of the first lens array 61 and the second small lenses 101a of the second lens array 101 are arranged at positions where the optical axes thereof coincide with each other in the present embodiment, but may be arranged at positions where the optical axes thereof deviate from each other.

The polarization conversion element 102 converts the polarization direction of the fluorescence Y emitted from the second lens array 101. Specifically, the polarization conversion element 102 converts each of the partial fluxes of the fluorescence Y divided by the first lens array 61 and then emitted from the second lens array 101 into linearly polarized light.

The polarization conversion element 102 includes a polarization separation layer that is not shown, and that directly transmits one linear polarization component out of the polarization components provided in the fluorescence Y emitted from the light source device 100 and reflects the other linear polarization component toward a direction perpendicular to the optical axis AX1, a reflecting layer that is not shown, and that reflects the other linear polarization component reflected by the polarization separation layer, toward a direction parallel to the optical axis AX1, and a wave plate that is not shown, and that converts the other linear polarization component reflected by the reflecting layer into the one linear polarization component.

The fluorescence Y transmitted through the polarization conversion element 102 enters the superimposing optical system 103. The superimposing optical system 103 forms a homogenous illumination optical system that homogenizes the intensity distribution of the fluorescence Y in each of the light modulation devices 4R, 4G which are the illumination target regions in cooperation with the integrator optical system 70.

In the light source device 100 in the present embodiment, when the excitation light E is emitted, the light emitting element 56 of the light source unit 51 generates heat. The heat generated in the light emitting element 56 is transmitted to the light source substrate 55. In the case of the present embodiment, the first heat dissipation member 71 is disposed on the second surface 55b of the light source substrate 55. Therefore, since the rigidity of the light source substrate 55 at the second surface 55b side is relatively higher, there is a possibility that the light source substrate 55 is warped to be convex toward the first surface 55a. In addition, when the first surface 55a of the light source substrate 55 is higher in temperature than the second surface 55b of the light source substrate 55, there is a possibility that the light source substrate 55 warps convexly toward the first surface 55a. That is, there is a possibility that the light source substrate 55 warps toward the wavelength conversion member 50.

Further, in the light source device 100 in the present embodiment, the heat generated in the wavelength conversion member 50 that emits the fluorescence Y is transferred to the support member 54. In the case of the present embodiment, the second heat dissipation member 72 is disposed on the back surface 32 of the support member 54. For this reason, since the rigidity of the support member 54 at the back surface 32 side is relatively higher, there is a possibility that the support member 54 warps convexly toward the opposite side to the back surface 32. In addition, when a part at the back surface 32 side of the support member 54 is higher in temperature than a part at the second heat dissipation member 72 side, there is a possibility that the support member 54 warps convexly toward the opposite side to the back surface 32. That is, there is a possibility that the support member 54 warps toward the light source unit 51.

When such a warpage as described above occurs, the distance between the light emitting element 56 disposed on the light source substrate 55 and the wavelength conversion member 50 changes, and therefore, there is a possibility that it becomes unachievable for the excitation light E emitted from the light emitting element 56 to efficiently enter the wavelength conversion member. In addition, there is a possibility that the light emitting element 56 comes into contact with the third surface 50c of the wavelength conversion member 50 to thereby be chipped or damaged.

In contrast, in the light source device 100 according to the present embodiment, the distance between the light emitting element 56 and the wavelength conversion member 50 is appropriately maintained by suppressing the occurrence of the warpage described above.

Characteristic points of the light source device 100 according to the present embodiment will hereinafter be described.

Figure 5:
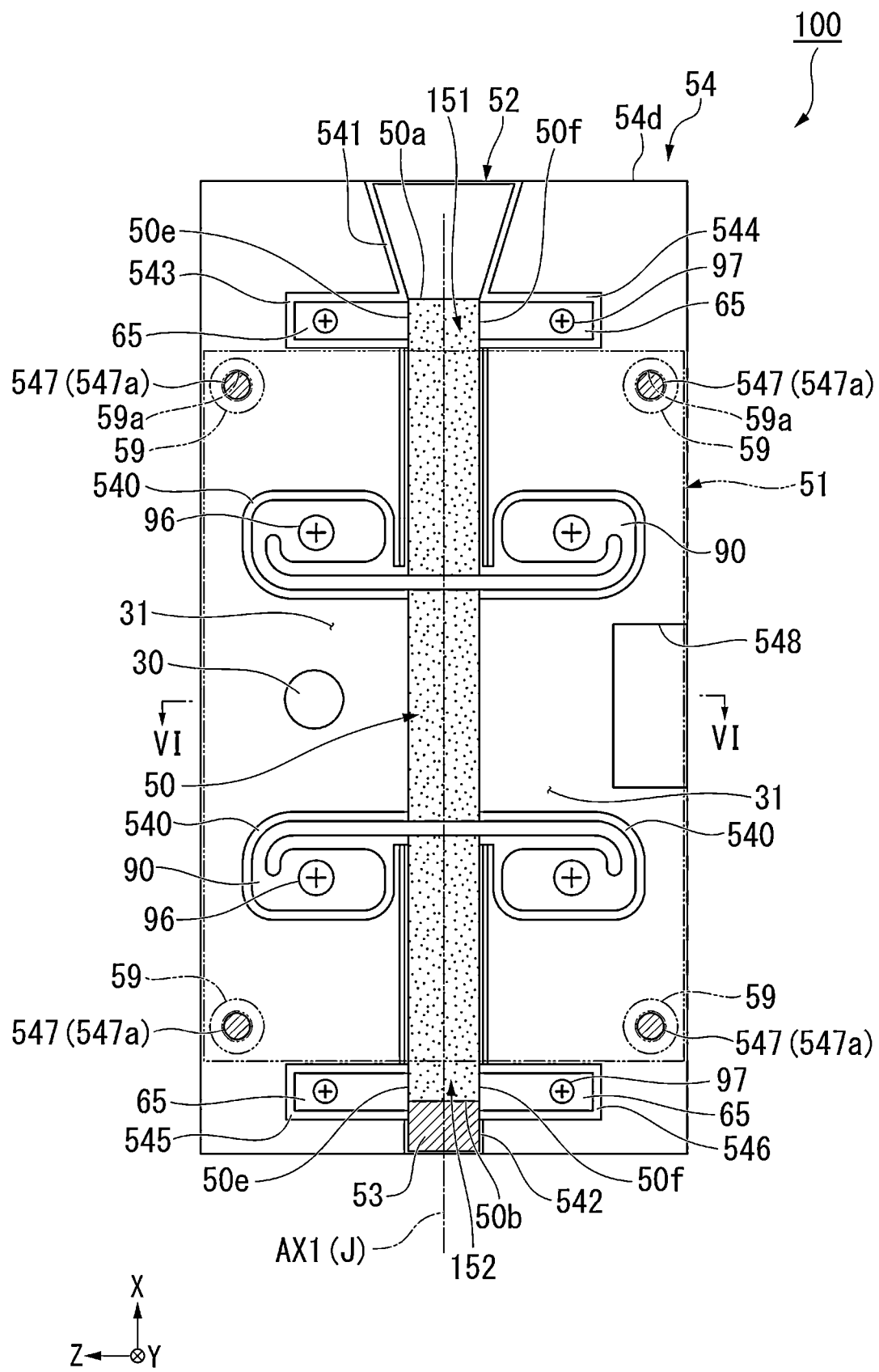
FIG. 5 is a plan view of a light source device viewed from a Y-axis direction.

FIG. 5 is a plan view of the light source device 100 viewed from the Y-axis direction. In FIG. 5, in order to make the drawing eye-friendly, the light source unit 51 is represented by a dashed-two dotted line. In addition, illustration of the light emitting element 56 is omitted in FIG. 5.

As illustrated in FIG. 5, the light source device 100 according to the present embodiment includes a convex portion 30 that brings the light source substrate 55 and the support member 54 into contact with each other. Specifically, the convex portion 30 is disposed on an opposed surface 31 of the support member 54 opposed to the first surface 55a of the light source substrate 55. The convex portion 30 brings the light source substrate 55 and the support member 54 into contact with each other in a state in which the light emitting element 56 is separated from the support member 54 and the wavelength conversion member 50.

In addition to the convex portion 30, the support member 54 includes spring fixation parts 540, a first housing portion 541, a second housing portion 542, a third housing portion 543, a fourth housing portion 544, a fifth housing portion 545, a sixth housing portion 546, a light source fixation part 547, and a cutout portion 548.

The spring fixation parts 540 are disposed at both sides of the groove 154 in the Z-axis direction along a transverse direction of the wavelength conversion member 50. The spring fixation parts 540 fix both end portions of the pressing members 90 disposed in a state of straddling the wavelength conversion member 50 in the Z-axis direction with screws 96. The cutout portion 548 is for suppressing interference with the connector unit 58 provided to the light source substrate 55 when the light source unit 51 is fixed to the support member 54.

The convex portion 30 is disposed at an inner peripheral side of the light source substrate 55 with respect to the fixation part 59. Here, the inner peripheral side of the light source substrate 55 with respect to the fixation part 59 means the inside of an imaginary line passing through the centers of the four through holes 59a forming the fixation part 59. That is, it can be rephrased that the convex portion 30 is disposed at a position closer to the center of the light source substrate 55 than the fixation part 59.

The convex portion 30 is a protruding body that protrudes in the −Y direction from the support member 54. The convex portion 30 may be formed integrally with the support member 54 or may be formed of a member independent of the support member 54. In the case of the present embodiment, the convex portion 30 is formed integrally with the support member 54.

The convex portion 30 is disposed at a position where the convex portion 30 does not overlap the light emitting elements 56 in a plan view in the Y direction that is the normal direction of the opposed surface 31 of the support member 54, and does not have contact with the wavelength conversion member 50. According to this configuration, it is possible to prevent an occurrence of a problem such as damage of the light emitting surface 56a due to the convex portion 30 making contact with the light emitting surface 56a of the light emitting element 56, or an interference of the incidence of the excitation light E emitted from the light emitting surface 56a on the wavelength conversion member 50 by the convex portion 30.

According to the light source device 100 in the present embodiment, the light source unit 51 and the support member 54 are in contact with each other via the convex portion 30 disposed between the light source substrate 55 and the support member 54. The convex portion 30 functions as a spacer that regulates the distance between the light source unit 51 and the support member 54 in the Y direction that is the stacking direction of the light source unit 51 and the support member 54. The convex portion 30 at least has such rigidity that the convex portion 30 does not deform in a state of being sandwiched between the light source unit 51 and the support member 54.

In a state where the light source substrate 55 is fixed to the support member 54, that is, in a state where the fixation part 59 of the light source substrate 55 is fixed to the light source fixation part 547 of the support member 54 with screws, the convex portion 30 is inserted into the concave portion 60 formed at the first surface 55a of the light source substrate 55. The convex portion 30 is in contact with the first insulating layer 551 exposed in the concave portion 60.

Here, the flatness of the first insulating layer 551 covering the obverse surface 550a of the base 550 is higher than the flatness of the second insulating layer 553 covering the interconnection layer 552. In the case of the present embodiment, since the convex portion 30 is in contact with the first insulating layer 551 higher in flatness than the second insulating layer 553, the support member 54 and the light source substrate 55 adhere to each other in good condition via the convex portion 30.

The height in the Y direction of the convex portion 30 is higher than the height in the Y direction of the pressing members 90 having contact with the third surface 50c of the wavelength conversion member 50. The convex portion 30 further protrudes toward the light source unit 51 than the pressing members 90 to thereby bring the pressing members 90 and the light source unit 51 into a separated state. The pressing members 90 are not in contact with the first surface 55a of the light source substrate 55 of the light source unit 51. For this reason, it is possible to prevent the occurrence of a problem that the interconnection layer 552 shown in FIG. 4 is broken or short-circuited due to the pressing members 90 applying pressure to the first surface 55a.

The light source fixation part 547 includes a plurality of pedestals 547a. The plurality of pedestals 547a corresponds to the plurality of through holes 59a of the fixation part 59 of the light source substrate 55. That is, the number of the pedestals 547a of the light source fixation part 547 and the number of the through holes 59a of the fixation part 59 are the same. Each of the pedestals 547a is provided with an internal thread for fixing a screw inserted into the through hole 59a corresponding thereto.

In a direction along the Y axis, the pedestals 547a are equal in height, and the height of the convex portion 30 is substantially equal to the height of the pedestals 547a. For example, when the gap between the light emitting surface 56a of the light emitting element 56 and the third surface 50c of the wavelength conversion member 50 is 0.3 mm, the tolerance of the pedestal 547a and the convex portion 30 is set to +0.1 mm or less.

In the case of the light source substrate 55 in the present embodiment, the convex portion 30 is in contact with the first insulating layer 551 exposed in the concave portion 60 as described above, but it is arranged that the first insulating layer 551 is exposed with respect to the fixation part 59 which the pedestals 547a the same in height as the convex portion 30 have contact with.

By making the height of the pedestals 547a and the height of the convex portion 30 uniform, and making the pedestals 547a and the convex portion 30 have contact with the first insulating layer 551 as described above, the light source substrate 55 and the support member 54 are supported in a stable state without rattling via the convex portion 30 and the light source fixation part 547.

Advantages of the convex portion 30 will hereinafter be described.

Here, there is considered when the convex portion 30 is not provided as a comparative example. In the case of the configuration of the comparative example, since the light source substrate 55 is fixed to the support member 54 at the fixation part 59 provided at the outer peripheral edge portions, when the warpage forming a convex shape toward the wavelength conversion member 50 supposedly occurs in the light source substrate 55, a portion at the inner circumferential side of the fixation part 59 comes closer to the wavelength conversion member 50.

On this occasion, there is a possibility that the excitation light E emitted from the light emitting element 56 disposed on the first surface 55a of the light source substrate 55 is not efficiently incident on the wavelength conversion member 50. In particular, the central portion of the light source substrate 55 far from the fixation part 59 comes closest to the wavelength conversion member 50, and therefore, there is a possibility that the light emitting element 56 makes contact with the third surface 50c of the wavelength conversion member 50 to thereby be chipped or damaged.

Figure 6:
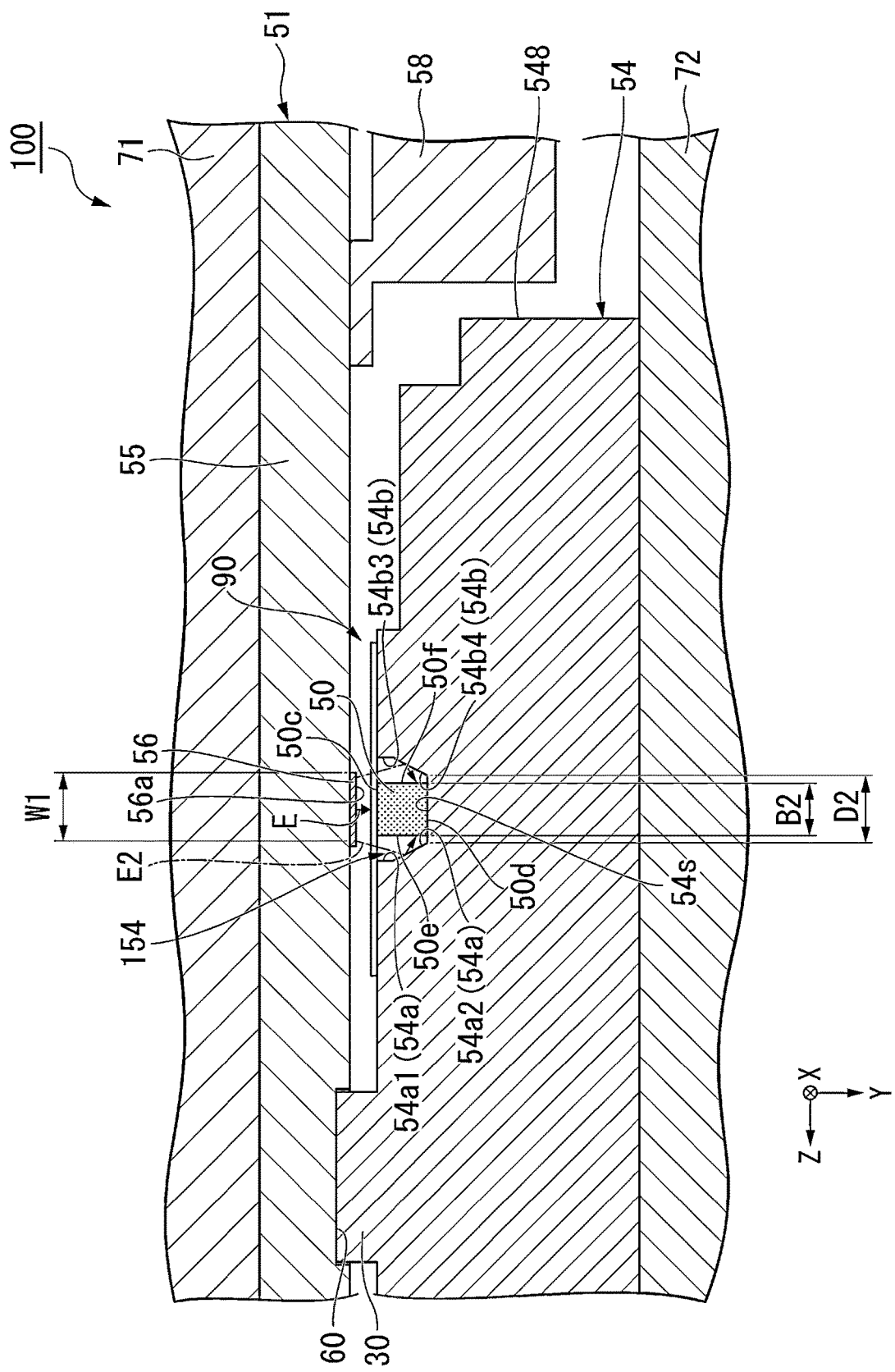
FIG. 6 is a cross-sectional view of the light source device taken along the line VI-VI in FIG. 5.

FIG. 6 is a cross-sectional view of the light source device 100 taken along the line VI-VI in FIG. 5.

As illustrated in FIG. 6, according to the light source device 100 in the present embodiment, the light source substrate 55 and the support member 54 are in contact with each other by the convex portion 30 located at the inner circumferential side of the fixation part 59. Therefore, the warpage of the light source substrate 55 toward the wavelength conversion member 50 is suppressed. Accordingly, in the light source device 100 in the present embodiment, by appropriately maintaining the distance between the light emitting element 56 and the third surface 50c of the wavelength conversion member 50, it is possible to generate the bright fluorescence Y by efficiently making the excitation light E incident on the wavelength conversion member 50, and at the same time, it is possible to prevent an occurrence of a problem such as cracks and damage caused by the contact between the light emitting element 56 and the wavelength conversion member 50.

Further, the groove 154 of the support member 54 has a U-shaped cross section perpendicular to the X-axis direction. The groove 154 has the support surface 54s, a first wall surface 54a, and a second wall surface 54b.

The support surface 54s corresponds to a bottom surface of the groove 154. In the case of the present embodiment, the support surface 54s is a surface extending in parallel to the X-Z plane and supports the fourth surface 50d of the wavelength conversion member 50. The first wall surface 54a corresponds to one side surface of the groove 154, and is opposed to the fifth surface 50e of the wavelength conversion member 50, and is separated from the fifth surface 50e. That is, a gap is provided between the first wall surface 54a and the fifth surface 50e of the wavelength conversion member 50. The second wall surface 54b corresponds to the other side surface of the groove 154, and is opposed to the sixth surface 50f of the wavelength conversion member 50, and is separated from the sixth surface 50f. That is, a gap is provided between the second wall surface 54b and the sixth surface 50f of the wavelength conversion member 50.

The first wall surface 54a includes a first part 54a1 located at the third surface 50c side, and a second part 54a2 located at the support surface 54s side. The first part 54a1 extends in a direction perpendicular to the support surface 54s, that is, in parallel to the X-Y plane. The second part 54a2 inclines so as to approach the fifth surface 50e as extending from the first part 54a1 side toward the support surface 54s. In other words, the distance between the second part 54a2 and the fifth surface 50e at the support surface 54s side is shorter than the distance between the second part 54a2 and the fifth surface 50e at the first part 54a1 side.

The second wall surface 54b includes a third part 54b3 located at the third surface 50c side, and a fourth part 54b4 located at the support surface 54s side. The third part 54b3 extends in a direction perpendicular to the support surface 54s, that is, in parallel to the X-Y plane. The fourth part 54b4 inclines so as to approach the sixth surface 50f as extending from the third part 54b3 side toward the support surface 54s. In other words, the distance between the fourth part 54b4 and the sixth surface 50f at the support surface 54s side is shorter than the distance between the fourth part 54b4 and the sixth surface 50f at the third part 54b3 side.

The first wall surface 54a and the second wall surface 54b are each formed of a surface of the metal such as aluminum or stainless steel as the constituent material of the support member 54. More specifically, the first wall surface 54a and the second wall surface 54b are each formed of a processed surface obtained by performing a mirror finishing treatment on the metal surface described above. Therefore, the first wall surface 54a and the second wall surface 54b each have light reflectivity and reflect the excitation light E incident thereon. Note that the first wall surface 54a and the second wall surface 54b may each be formed of another metal film, or a dielectric multilayer film formed at the surface of the metal such as aluminum or stainless steel.

Since the first wall surface 54a and the second wall surface 54b of the groove 154 need to go through the mirror finishing treatment as described above, a region provided with the groove 154 is required to be higher in processing accuracy compared to other regions of the support member 54. Therefore, it is possible to form a portion of the support member 54 where the groove 154 is provided with a separate member, and then combine the portion with a separate member provided with other portions than the groove 154 to form a single support member 54. That is, the support member 54 may be formed by combining a plurality of members with each other. In this way, since the peripheral region of the groove 154 is formed of a separate member, it is possible to increase the workability and the processing accuracy of the first wall surface 54a and the second wall surface 54b of the groove 154.

A dimension W1 along the Z-axis direction of the light emitting surface 56a of the light emitting elements 56 is larger than a width B2 along the Z-axis direction of the wavelength conversion member 50. Note that the width in the Z-axis direction of the wavelength conversion member 50 in the present embodiment is uniform over the entire length in the longitudinal direction.

Thus, in the Z-axis direction, both end portions of a light emitting surface 56a of the light emitting element 56 protrude outside the third surface 50c of the wavelength conversion member 50. Specifically, both the end positions of the light emitting surface 56a of the light emitting element 56 protrude to positions overlapping a gap between the fifth surface 50e and the first wall surface 54a and a gap between the sixth surface 50f and the second wall surface 54b. In other words, when the light emitting surface 56a is viewed from the support surface 54s along the Y-axis direction, a part of the light emitting surface 56a overlaps the third surface 50c, another part of the light emitting surface 56a overlaps the gap between the fifth surface 50e and the first wall surface 54a and the gap between the sixth surface 50f and the second wall surface 54b.

A first width D2 along the Z-axis direction of the support surface 54s of the support member 54 is larger than the width B2 along the Z-axis direction of the wavelength conversion member 50. Thus, in the Z-axis direction, both the end portions of the support surface 54s protrude outside the fourth surface 50d of the wavelength conversion member 50. In other words, when the support surface 54s is viewed from the light emitting surface 56a along the Y-axis direction, a part of the support surface 54s overlaps the fourth surface 50d, and another part of the support surface 54s is exposed outside the fourth surface 50d. As described above, the support surface 54s has an exposed portion exposed outside the wavelength conversion member 50.

According to the light source device 100 in the present embodiment, the excitation light E2 emitted from the light emitting surface 56a of the light emitting element 56 as partial excitation light E2 travels through the gap between the fifth surface 50e of the wavelength conversion member 50 and the first part 54a1, and is then incident on the second part 54a2, which inclines with respect to the support surface 54s. On this occasion, the excitation light E2 is reflected by the second part 54a2 and is then incident on the fifth surface 50e of the wavelength conversion member 50. As described above, since the excitation light E2 passing through the gap between the fifth surface 50e of the wavelength conversion member 50 and the first wall surface 54a becomes easy to enter the fifth surface 50e, it is possible to reduce an amount of the excitation light E that is reflected by the support surface 54s and then returns toward the light source unit 51. Further, a part of the excitation light E is reflected by the first part 54a1 which extends perpendicularly to the support surface 54s, and is then incident on the fifth surface 50e of the wavelength conversion member 50. Thus, it is possible to realize the light source device 100 which is high in use efficiency of the excitation light E, and is easy to obtain the fluorescence Y having the desired intensity.

Referring back to FIG. 5, the first housing portion 541 is a concave portion that communicates with a +X direction side of the groove 154. The first housing portion 541 penetrates up to an outer edge 54d of the support member 54.

The first housing portion 541 houses the first protruding portion 151 of the wavelength conversion member 50 which protrudes from the groove 154. Further, the first housing portion 541 holds the angle conversion member 52 fixed to the first surface 50a of the wavelength conversion member 50. In the present embodiment, the angle conversion member 52 fixed to the first surface 50a of the first protruding portion 151 is held by the support member 54.

The light exit surface 52b of the angle conversion member 52 housed in the first housing portion 541 is coplanar with the outer edge 54d of the support member 54 in the plan view.

The second housing portion 542 is a concave portion that communicates with the −X direction side of the groove 154. The second housing portion 542 penetrates up to the outer edge 54d of the support member 54. The second housing portion 542 houses the second protruding portion 152 of the wavelength conversion member 50, which protrudes from the groove 154. The second housing portion 542 is disposed in a state of not communicating with the outer edge 54d of the support member 54. The second housing portion 542 houses the second protruding portion 152 of the wavelength conversion member 50, which protrudes from the groove 154. In the present embodiment, the mirror 53 is disposed on the second surface 50b of the second protruding portion 152. The second housing portion 542 houses the mirror 53 disposed on the second surface 50b of the wavelength conversion member 50.

The third housing portion 543 is a concave portion that communicates with the +Z direction side of the first housing portion 541. The third housing portion 543 houses the holding member 65 that holds the +Z side of the first protruding portion 151 of the wavelength conversion member 50 housed in the first housing portion 541.

The fourth housing portion 544 is a concave portion that communicates with the −Z direction side of the first housing portion 541. The fourth housing portion 544 houses the holding member 65 that holds the −Z side of the first protruding portion 151 of the wavelength conversion member 50 housed in the first housing portion 541.

The fifth housing portion 545 is a concave portion that communicates with the +Z direction side of the second housing portion 542. The fifth housing portion 545 houses the holding member 65 that holds a portion of the +Z side of the second protruding portion 152 of the wavelength conversion member 50 housed in the second housing portion 542.

The sixth housing portion 546 is a concave portion that communicates with the −Z direction side of the third housing portion 543. The sixth housing portion 546 houses the holding member 65 that holds the −Z side of the second protruding portion 152 of the wavelength conversion member 50 housed in the second housing portion 542.

The positions in the Z-axis direction of the pair of holding members 65 which sandwich the first protruding portion 151 and the second protruding portion 152 of the wavelength conversion member 50 from both sides are made adjustable.

In this way, the wavelength conversion member 50 in the present embodiment is held in the groove 154 in a state in which the movement in the Z-axis direction in the first protruding portion 151 and the second protruding portion 152 protruding outside the groove 154 is restricted by the holding members 65.

As described above, the light source device 100 according to the present embodiment includes the light source unit 51 including the light source substrate 55 including the first surface 55a and the second surface 55b, and the light emitting elements 56 provided on the first surface 55a of the light source substrate 55, the wavelength conversion member 50 on which the excitation light E emitted from the light emitting elements 56 of the light source unit 51 is incident, the support member 54 supporting the wavelength 50, the fixation part 59 disposed on the outer peripheral edge portion of the light source substrate 55 and fixing the light source unit 51 and the support member 54 so that the light emitting elements 56 and the wavelength conversion member 50 are opposed to each other, and the convex portion 30 located at the inner peripheral side of the light source substrate 55 with respect to the fixation part 59. The support member 54 has the groove 154, the wavelength conversion member 50 is disposed on the groove 154, and the light source substrate 55 and the support member 54 are in contact with each other due to the convex portion 30. The convex portion 30 is disposed on the opposed surface 31 opposed to the first surface 55a of the light source substrate 55 in the support member 54, and separates the light emitting elements 56 from the support member 54 and the wavelength conversion member 50.

According to the light source device 100 in the present embodiment, since the warpage of the light source substrate 55 toward the wavelength conversion member 50 can be suppressed by providing the convex portion 30, it is possible to keep an appropriate distance between the light emitting elements 56 and the third surface 50c of the wavelength conversion member 50. Accordingly, it is possible to generate the bright fluorescence Y by making the excitation light E efficiently incident on the wavelength conversion member 50, and at the same time, it is possible to prevent an occurrence of a problem such as cracks and damage caused by the contact between the light emitting elements 56 and the wavelength conversion member 50.

Further, there is also a possibility that the light source substrate 55 having a multilayer structure is warped due to residual stress of the insulating layer made of, for example, a resist film. The light source device 100 according to the present embodiment is effective to prevent a problem caused by the warpage of the light source substrate 55 due to the residual stress.

The projector 1 according to the present embodiment includes the light source device 100 which efficiently extracts the bright fluorescence Y from the wavelength conversion member 50, and is therefore excellent in light use efficiency.

First Modified Example

A first modified example of the present embodiment will hereinafter be described.

Figure 7:
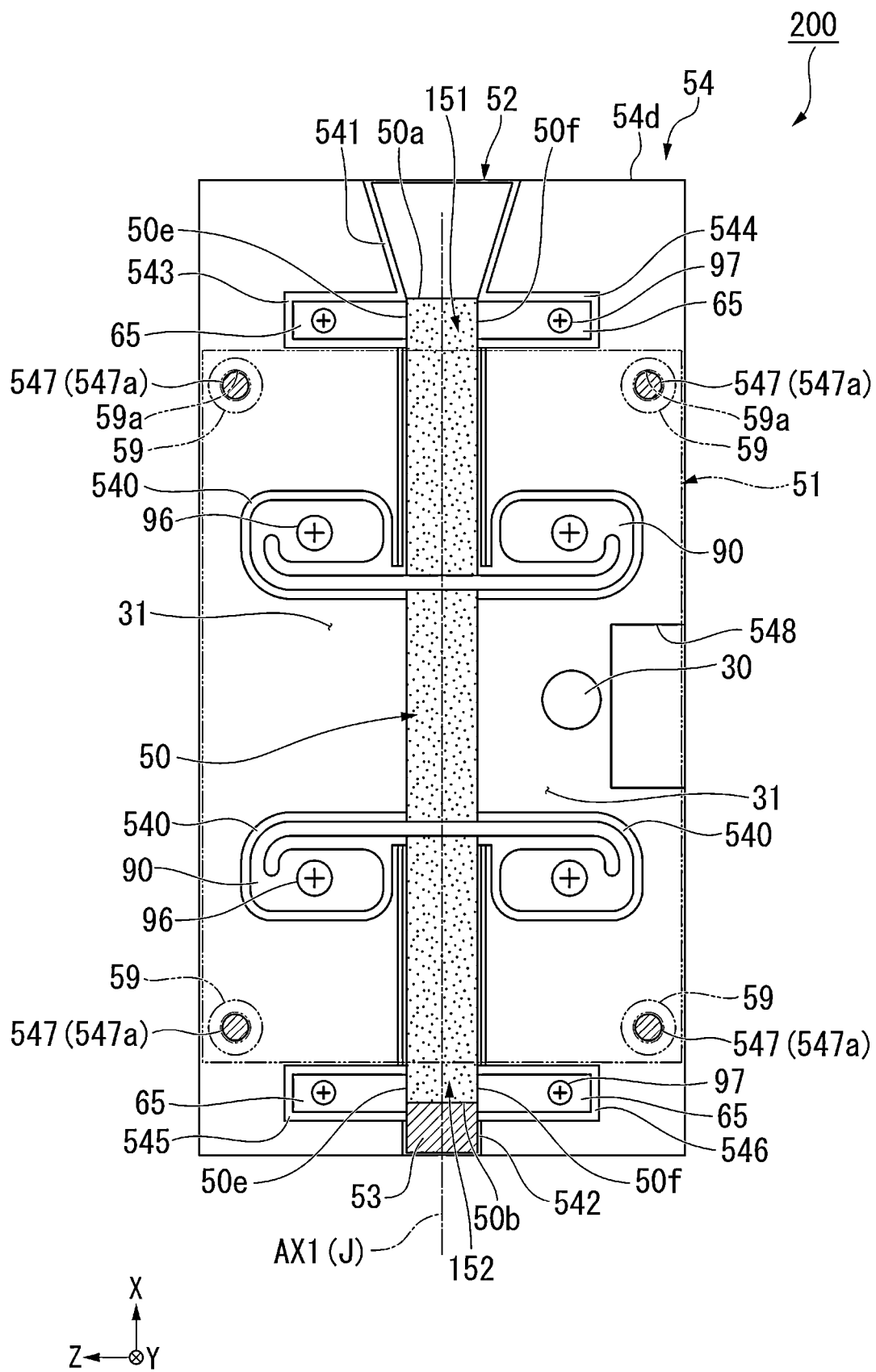
FIG. 7 is a plan view showing a configuration of a main part of a light source device according to a first modified example.

FIG. 7 is a plan view showing a configuration of a main part of a light source device according to the first modified example. In the following drawing, elements common to those of the light source device 100 according to the embodiment described above are denoted by the same reference symbols, and the description thereof will be omitted.

In the light source device 200 according to the present modified example, the convex portion 30 is located at the −Z direction side with respect to the groove 154. The convex portion 30 is located between the groove 154 and the cutout portion 548 in a direction along the Z axis. That is, a difference between the light source device 200 according to the present modified example and the light source device 100 according to the embodiment described above is the position of the convex portion 30, and the rest of the configuration is common thereto.

Also in the light source device 200 according to the present modified example, by providing the convex portion 30, the warpage of the light source substrate 55 toward the wavelength conversion member 50 can be suppressed. Accordingly, it is possible to generate the bright fluorescence Y, and at the same time, to suppress the occurrence of the problem caused by the contact between the light source unit 51 and the wavelength conversion member 50.

Second Modified Example

A second modified example of the present embodiment will hereinafter be described.

Figure 8:
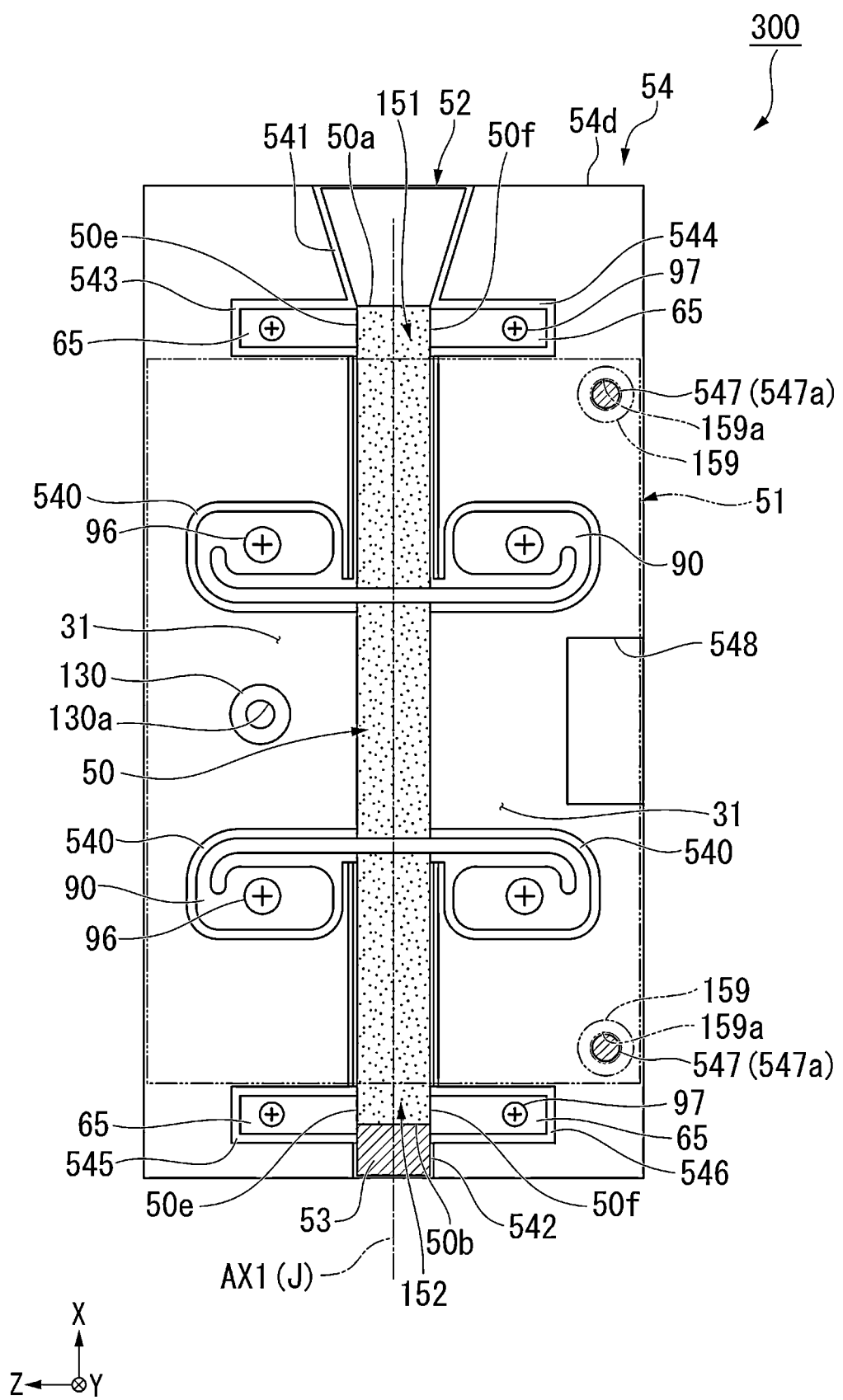
FIG. 8 is a plan view showing a configuration of a main part of a light source device according to a second modified example.

FIG. 8 is a plan view showing a configuration of a main part of a light source device according to the second modified example. In the following drawing, elements common to those of the light source device 100 according to the embodiment described above are denoted by the same reference symbols, and the description thereof will be omitted.

In the light source device 300 according to the present modified example, the light source substrate 55 and the support member 54 are fixed at three locations. As shown in FIG. 8, in the light source device 300 according to the present modified example, a fixation part 159 of the light source substrate 55 is formed of two through holes 159a. The through holes 159a are respectively disposed at two corner portions located along the long side at the −Z side of the light source substrate 55 having a rectangular shape. A convex portion 130 is disposed at the inner peripheral side of the fixation part 159.

In the case of the present modified example, the convex portion 130 also serves as a screw fixation part for fixing the light source substrate 55 and the support member 54 with a screw. Therefore, the convex portion 130 has a threaded hole 130a for fixing the screw.

Also in the light source device 300 according to the present modified example, by providing the convex portion 130, the warpage of the light source substrate 55 toward the wavelength conversion member 50 can be suppressed. Accordingly, it is possible to generate the bright fluorescence Y, and at the same time, to suppress the occurrence of the problem caused by the contact between the light source unit 51 and the wavelength conversion member 50.

Third Modified Example

A third modified example of the present embodiment will hereinafter be described.

Figure 9:
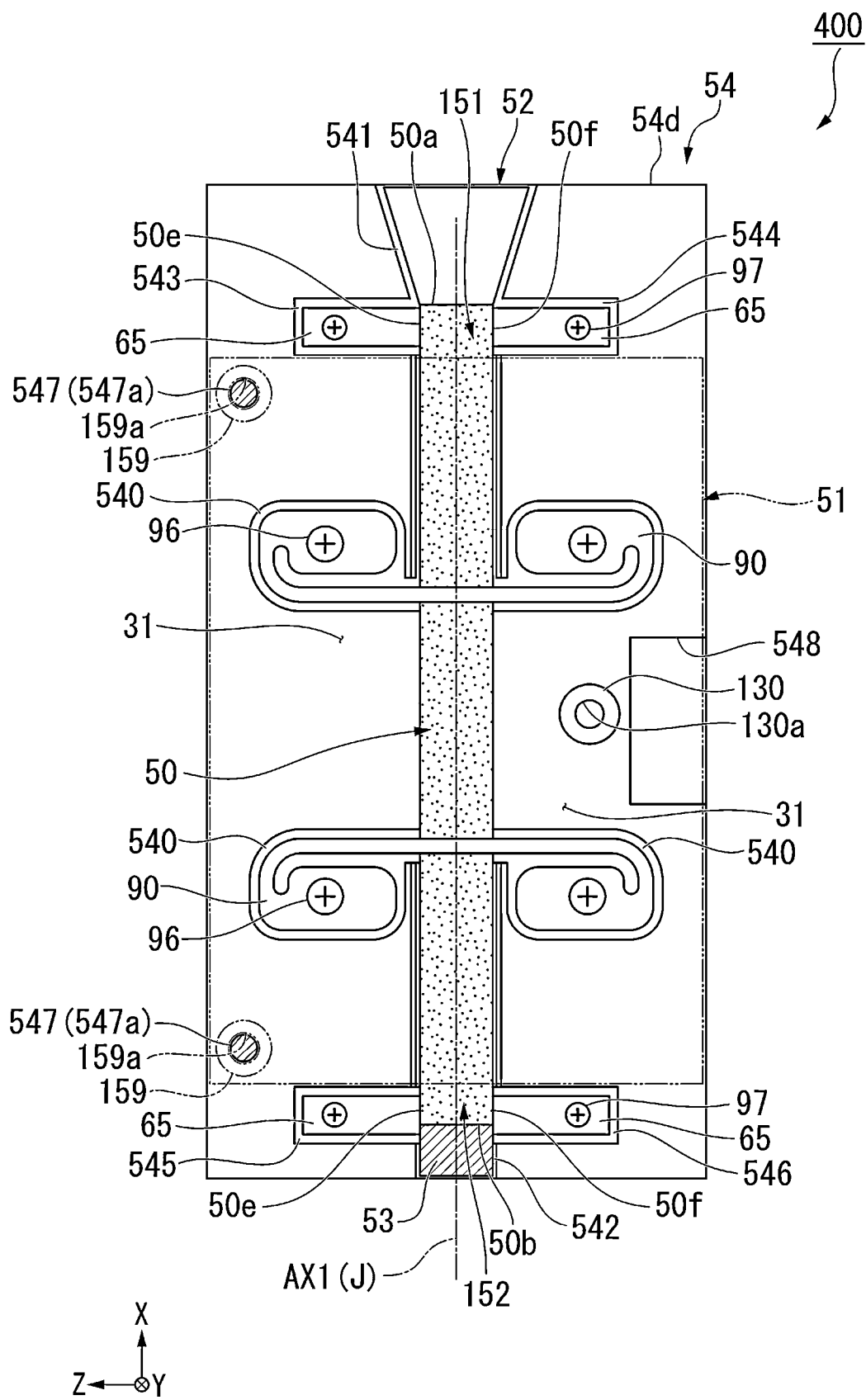
FIG. 9 is a plan view showing a configuration of a main part of a light source device according to a third modified example.

FIG. 9 is a plan view showing a configuration of a main part of a light source device according to the third modified example. In the following drawing, elements common to those of the light source device 100 according to the embodiment described above are denoted by the same reference symbols, and the description thereof will be omitted.

In the light source device 400 according to the present modified example, the convex portion 130 of the light source device 300 according to the second modified example is located at the −Z direction side with respect to the groove 154. Specifically, the two through holes 159a constituting the fixation part 159 of the light source substrate 55 are disposed respectively at two corner portions located along the long side at the +Z side of the light source substrate 55 having a rectangular shape, and the convex portion 130 is located between the groove 154 and the cutout portion 548 in a direction along the Z axis.

Also in the light source device 400 according to the present modified example, by providing the convex portion 130, the warpage of the light source substrate 55 toward the wavelength conversion member 50 can be suppressed. Accordingly, it is possible to generate the bright fluorescence Y, and at the same time, to suppress the occurrence of the problem caused by the contact between the light source unit 51 and the wavelength conversion member 50.

Note that the technical scope of the present disclosure is not limited to the embodiments described above, and a variety of changes can be made thereto without departing from the intent of the present disclosure.

For example, there is cited when the convex portion 30 is provided to the support member 54 as an example in the light source device 100 according to the embodiment described above, but it is possible to dispose the convex portion on the first surface 55a of the light source substrate 55. Alternatively, it is possible to separate the light emitting element 56 from the support member 54 and the wavelength conversion member 50 by abutting convex portions provided respectively to the support member 54 and the first surface 55a of the light source substrate 55 with each other.

In the light source device 100 according to the embodiment described above, there is cited when the pressing member 90 which presses the wavelength conversion member 50 against the support surface 54s of the groove 154 is provided to the support member 54 as an example, but it is possible to press the wavelength conversion member 50 against the support surface 54s of the groove 154 with a pressing member disposed at the light source substrate 55 side.

There is adopted the configuration in which the convex portion 30 is inserted into the concave portion 60 of the light source substrate 55 in the light source device 100 according to the embodiment described above, but it is possible to adopt a configuration in which the convex portion is made to have contact with the first surface 55a of the light source substrate 55 not provided with the concave portion. In this case, the pedestal 547a of the support member 54 and the upper surface of the convex portion 30 may be aligned at the same height.

In the light source device 100 according to the embodiment described above, it is possible to adopt a configuration in which the light source substrate 55 and the support member 54 can be fixed with a screw in the convex portion 30. According to this configuration, by increasing the number of fixation places between the light source substrate 55 and the support member 54, the light source unit 51 and the support member 54 can more firmly be fixed.

There is cited when the wavelength conversion member 50 includes the first protruding portion 151 and the second protruding portion 152 in the X-axis direction as an example in the light source device 100 according to the embodiment described above, but it is possible to dispose the first protruding portion 151 alone. In this case, the holding member 65 is disposed only at the first protruding portion 151 side.

In the embodiment described above, each of the wall surfaces of the groove 154 of the support member 54 has a portion perpendicular to the support surface 54s and a portion inclining with respect to the support surface 54s, but the groove 154 does not necessarily have a specific shape, and all the regions of the wall surfaces of the groove may instead, for example, be perpendicular to the support surface. Further, the wall surfaces of the groove may be curved.

The aforementioned embodiment has been described with reference to the case where the present disclosure is applied to the light source device including the wavelength conversion member. In place of the configuration described above, the present disclosure may be applied to a light source device in which the light having entered the light source device propagates without being involved in wavelength conversion and then exits out of the light source device, for example, with the angular distribution controlled. In this case, the wavelength conversion member in the embodiment described above is replaced with a light guide member, and the light emitted from the light emitting elements exits out of the angle conversion member as light having the same wavelength band.

In addition, the specific descriptions of the shape, the number, the arrangement, the materials, and other factors of the elements of the light source device and the projector are not limited to those in the embodiments described above and can be changed as appropriate. The aforementioned embodiments have been described with reference to the case where the light source device according to the present disclosure is incorporated in a projector using a liquid crystal panel, but not necessarily. The light source device according to the present disclosure may be incorporated in a projector using a digital micromirror device as the light modulation device. The projector may not include a plurality of light modulation devices and may instead include just one light modulation device.

The aforementioned embodiment has been described with reference to the case where the wavelength conversion member 50 is pressed against the support member 54 by the two pressing members 90, but the number of the pressing members 90 is not limited thereto. For example, when an enough amount of excitation light E that enters the wavelength conversion member 50 from the light emitting elements 56 can be secured, three or more pressing members 90 may be provided.

The aforementioned embodiment has been described with reference to the case where the light source device according to the present disclosure is incorporated in a projector, but not necessarily. The light source device according to the present disclosure may be used as a lighting apparatus, a headlight of an automobile, and other components.

The present disclosure will be summarized below as supplementary notes.

Supplementary Note 1

A light source device including:
  a light source unit including a light source substrate including a first surface and a second surface opposite to the first surface, and a light emitting element disposed on the first surface of the light source substrate;
  a light guide member configured to guide light emitted from the light emitting element of the light source unit;
  a support member configured to support the light guide member;
  a fixation part provided to an outer peripheral edge portion of the light source substrate and configured to fix the light source unit and the support member to each other so that the light emitting element disposed on the first surface of the light source substrate and the light guide member are opposed to each other; and
  a convex portion located at an inner peripheral side of the light source substrate with respect to the fixation part, wherein
  the support member includes a groove in which the light guide member is disposed, the light source substrate and the support member are in contact with each other with the convex portion, and the convex portion is disposed on at least one of an opposed surface opposed to the first surface of the light source substrate and the first surface of the light source substrate to separate the light emitting element from the support member and the light guide member.

According to the light source device having this configuration, since the warpage of the light source substrate toward the light guide member is suppressed by providing the convex portion, it is possible to keep an appropriate distance between the light emitting element and the light guide member. Accordingly, it is possible to make the light from the light emitting element efficiently incident on the light guide member, and at the same time, it is possible to prevent the occurrence of a problem such as cracks and damage caused by the contact between the light emitting element and the light guide member. In addition, the light source device of this configuration is effective for the prevention of the problem caused by the warpage of the light source substrate due to, for example, residual stress.

Supplementary Note 2

The light source device described in Supplementary Note 1, wherein the convex portion is provided to the support member.

According to this configuration, the height of the convex portion can easily be ensured compared to when the convex portion is provided to the light source substrate.

Supplementary Note 3

The light source device described in Supplementary Note 2, wherein the light source substrate of the light source unit includes a base, a first insulating layer disposed on one surface of the base, an interconnection layer stacked at an opposite side of the first insulating layer to the base, and a second insulating layer stacked at an opposite side of the first insulating layer to the base so as to cover at least a part of the interconnection layer, and the convex portion is in contact with the first insulating layer.

The flatness of the second insulating layer covering the interconnection layer is lower than the flatness of the first insulating layer covering the one surface of the base. According to this configuration, since the convex portion is in contact with the first insulating layer higher in flatness than the second insulating layer, the support member and the light source substrate can favorably be brought into close contact with each other via the convex portion.

Supplementary Note 4

The light source device described in any one of Supplementary Notes 1 to 3, further including:

a heat dissipation member fixed to the second surface of the light source substrate of the light source unit.

According to this configuration, the heat can efficiently be released from the light source substrate by the heat dissipation member. In addition, the light source substrate can suppress the occurrence of the warpage convex toward the second surface due to the heat dissipation member.

Supplementary Note 5

The light source device described in any of Supplementary Notes 1 to 4, further including:

a pressing member configured to press the light guide member against the support member, wherein the convex portion is configured to separate the pressing member and the light source unit from each other.

According to the configuration described above, the pressing member allows the light guide member to be satisfactorily in contact with the support surface of the groove. In addition, since the pressing member and the light source unit are not in contact with each other, it is possible to prevent a problem such as breakage caused by the contact between the pressing member and the light source unit.

Supplementary Note 6

The light source device described in any of Supplementary Notes 1 to 5, wherein the convex portion is disposed at a position where the convex portion does not overlap the light emitting element in a plan view in a normal direction of the first surface and is not in contact with the light guide member.

According to this configuration, it is possible to prevent the occurrence of the damage due to the contact between the light emitting element and the convex portion, and the occurrence of a problem that the convex portion interferes with the incidence of the light emitted from the light emitting element on the light guide member.

Supplementary Note 7

The light source device described in any one of Supplementary Notes 1 to 6, wherein the light emitting element emits first light having a first wavelength band, and the light guide member is a wavelength conversion member that includes a phosphor, and is configured to convert the first light emitted from the light emitting element into second light having a second wavelength band different from the first wavelength band to emit the second light.

According to this configuration, it is possible to realize the light source device which is high in use efficiency of the first light, and obtains the second light having a desired intensity.

Supplementary Note 8

A projector including:

the light source device described in any one of Supplementary Notes 1 to 7;

a light modulation device configured to modulate light emitted from the light source device in accordance with image information; and a projection optical device configured to project the light modulated by the light modulation device.

According to the projector having this configuration, since the light source device described above is provided, it is possible to provide a projector excellent in light use efficiency.

What is claimed is:

1. A projector comprising:
a light source including a light source substrate having a first surface and a second surface opposite to the first surface, and a light emitter disposed on the first surface of the light source substrate;
a light guide guiding light emitted from the light emitter of the light source;
a support supporting the light guide in a groove;
a fixator provided to an outer peripheral edge portion of the light source substrate for fixing the light source and the support to each other so that the light emitter disposed on the first surface of the light source substrate and the light guide are opposed to each other; and
a convex portion located at an inner peripheral side of the light source substrate with respect to the fixator, wherein
the support includes the groove in which the light guide is disposed,
the light source substrate and the support are in contact with each other and the convex portion, the convex portion is disposed on at least one of an opposed surface opposed to the first surface of the light source substrate and the first surface of the light source substrate to separate the light emitter from the support and the light guide, the convex portion is provided to the support, the light source substrate of the light source includes a base, a first insulating layer disposed on one surface of the base, an interconnection layer stacked at an opposite side of the first insulating layer to the base, and a second insulating layer stacked at an opposite side of the first insulating layer to the base so as to cover at least a part of the interconnection layer, and the convex portion is in contact with the first insulating layer.

2. The projector according to claim 1, further comprising:
a heat dissipator fixed to the second surface of the light source substrate of the light source.

3. The projector according to claim 1, further comprising:
a positional restrictor for pressing the light guide against the support, wherein
the convex portion separates the pressing member and the light source from each other.

4. The projector according to claim 1, wherein
the convex portion is disposed at a position where the convex portion does not overlap the light emitter in a plan view in a normal direction of the opposed surface of the support and is not in contact with the light guide.

5. The projector according to claim 1, wherein
the light emitter emits a first light having a first wavelength band, and
the light guide is a wavelength converter that includes a phosphor, and the light guide converts the first light emitted from the light emitter into a second light having a second wavelength band different from the first wavelength band.

6. The projector according to claim 1, wherein
a light modulation device is configured to modulate light emitted from the projector in accordance with image information to form a modulated emitted light; and
a projection optical device configured to project the modulated emitted light.

* * * * *